United States Patent
Milroy et al.

(10) Patent No.: US 11,088,463 B1
(45) Date of Patent: Aug. 10, 2021

(54) REALIZATION AND APPLICATION OF SIMULTANEOUS CIRCULAR POLARIZATION IN SWITCHABLE SINGLE POLARIZATION SYSTEMS

(71) Applicant: ThinKom Solutions, Inc., Hawthorne, CA (US)

(72) Inventors: William W. Milroy, Torrance, CA (US); Raymond Valdes, Downey, CA (US)

(73) Assignee: ThinKom Solutions, Inc., Hawthorne, CA (US)

( * ) Notice: Subject to any disclaimer, the term of this patent is extended or adjusted under 35 U.S.C. 154(b) by 0 days.

(21) Appl. No.: 16/775,375

(22) Filed: Jan. 29, 2020

(51) Int. Cl.
*H01Q 15/24* (2006.01)
*H01Q 21/00* (2006.01)
*H01Q 21/24* (2006.01)

(52) U.S. Cl.
CPC ......... *H01Q 15/244* (2013.01); *H01Q 15/246* (2013.01); *H01Q 21/0006* (2013.01); *H01Q 21/245* (2013.01)

(58) Field of Classification Search
CPC .. H01Q 21/245; H01Q 15/242; H01Q 15/244; H01Q 13/28; H01Q 25/001; H01Q 21/24; H01Q 3/26; H01Q 13/02; H01Q 1/42; H01Q 21/061; H01Q 13/0233; H01Q 13/0208; H01Q 13/206; H01Q 19/005; H01Q 15/24; H04B 1/0475; H04B 7/18513; H04B 1/401; H04B 7/10; H04B 7/0682
See application file for complete search history.

(56) References Cited

U.S. PATENT DOCUMENTS 3,215,957 A  11/1965 Dantzig et al.
3,581,242 A  5/1971 Lavedan
(Continued)

FOREIGN PATENT DOCUMENTS

EP  2 725 657 A  4/2014

OTHER PUBLICATIONS

Borisov et al., "Antennas for Satcom-on-the-Move, Review," 2014 International Conference on Engineering and Telecommunication, 2014.
(Continued)

*Primary Examiner* — Vibol Tan
(74) *Attorney, Agent, or Firm* — Kusner & Jaffe

(57) ABSTRACT

A system and method provide simultaneous dual polarization operation using a linearly-polarized planar antenna and a polarizer spaced apart from the linearly-polarized planar antenna, the polarizer including a first polarization state having primarily one of left-hand circular polarization (LHCP) or right-hand circular polarization (RHCP), and a third polarization state having linear polarization from which a combination of both LHCP and RHCP is simultaneously derived. The polarizer is placed in the first polarization state to at least one of transmit or receive a signal having primarily one of LHCP or RHCP, and the polarizer is placed in the third polarization state to simultaneously transmit and/or receive two different signals, where a first signal of the two different signals has primarily LHCP and a second signal of the two different signals has primarily RHCP.

22 Claims, 4 Drawing Sheets

(56) References Cited

U.S. PATENT DOCUMENTS

| | | | | |
|---|---|---|---|---|
| 4,716,415 | A * | 12/1987 | Kelly | H01Q 21/0006 343/770 |
| 5,337,058 | A | 8/1994 | Cross | |
| 6,452,561 | B1 | 9/2002 | West et al. | |
| 6,507,323 | B1 | 1/2003 | West | |
| 6,563,470 | B2 | 5/2003 | Em et al. | |
| 6,697,133 | B2 | 2/2004 | Fan et al. | |
| 7,642,978 | B2 * | 1/2010 | Braunstein | H01Q 3/02 343/754 |
| 8,339,326 | B2 * | 12/2012 | Guler | H01Q 15/244 343/754 |
| 9,941,594 | B2 * | 4/2018 | Milroy | H01Q 15/242 |
| 9,972,915 | B2 * | 5/2018 | Milroy | H01Q 3/2694 |
| 10,819,022 | B1 * | 10/2020 | Milroy | H01Q 13/065 |
| 2005/0062661 | A1 * | 3/2005 | Zagiiloul | H01Q 15/244 343/756 |
| 2010/0109960 | A1 | 5/2010 | Guler et al. | |
| 2020/0313303 | A1 * | 10/2020 | Milroy | H01Q 21/0006 |

OTHER PUBLICATIONS

Hum et al., "Reconfigurable Reflectarrays and Array Lenses for Dynamic Antenna Beam Control: A Review," IEEE Transactions of Antennas and Propagation, 2013.

Ramamurthy et al., "Dual Polarization Frequency Reuse in SATCOM: A Method to Counter Poor Cross-Polar Isolation," 2014 IEEE Military Communications Conference, 2014.

Arapoglou et al., "MIMO over Satellite: A Review," IEEE Communications Surveys & Tutorials, 2011.

Extended European Search Report and Written Opinion issued in related European Patent Application No. 21153223.9 dated Jun. 14, 2021.

Li, Long et al., "Novel Polarization-Reconfigurable Converter Based on Multilayer Frequency-Selective Surfaces," Proceedings of the IEEE, vol. 103, No. 7, Jul. 1, 2015, pp. 1057-1070.

* cited by examiner

REALIZATION AND APPLICATION OF SIMULTANEOUS CIRCULAR POLARIZATION IN SWITCHABLE SINGLE POLARIZATION SYSTEMS

TECHNICAL FIELD

The present invention relates generally to antenna systems and, more particularly, to a switchable-polarization antenna system and method that can support simultaneous dual-polarization.

BACKGROUND ART

There are a number of applications in which the ability to simply, inexpensively, and simultaneously support both right-hand circular polarization (RHCP) and left-hand circular polarization (LHCP) provides strong operational benefit. For example, in satellite applications it is common to employ alternative polarizations (RHCP and LHCP) and distinct frequencies (f1 and f2) between adjacent spot beams ("foot prints" along the surface of the earth.) This polarization and frequency "color scheme" allows for suppression of undesirable interference from nearby beams. Adjacent spot beams are situated to partially overlap with each other, thereby providing a narrow overlapping region where a mobile user terminal can seamlessly "transition" from one beam to another. This "negotiation" or "handoff" between adjacent beams generally requires relatively complex dual-polarized (RHCP and LHCP) antenna implementations in order to (temporarily) receive (and transmit) both RHCP and LHCP polarizations that are present in these overlapping transition regions. These complex dual-polarized antenna implementations drive up system complexity and cost.

Additionally, it is common for a given satellite service to employ both "overlay" (a broad geographic coverage region) and spot beams (multiple narrow overlapping geographic coverage regions) over a common user area for the purpose of supporting both broadcast (via the "overlay") and broadband internet (via the various spot beams.) Broadcast can include television programming, video, and/or data streams such as software upgrades and-the-like. Similar to the aforementioned case in the adjacent spot beam overlap regions, it is common practice to employ both polarization and frequency discrimination between overlapping the spot beam(s) and the "overlay" beam in order to suppress undesired interference. Again, the ability to support both RHCP and LHCP simultaneously (without added complexity and cost) is a highly valued capability.

Specialized dual-polarized parabolic dish antennas (with complex feed horn structures) are capable of receiving and transmitting simultaneous dual circular polarizations (RHCP and LHCP.) However, these antennas are non-planar (i.e., they are high-profile) and costly, and are generally limited in their ability to support the wider frequency bandwidth and higher beam agility demands of modern satellite user terminals.

Dual-polarized planar array antennas, employing dual-polarized radiating patches, slots, or open-ended waveguides, have been successfully demonstrated, but are very complex. Further, and similar to the dual-polarized parabolic dish antennas, these dual-polarized planar array antennas typically suffer from the same frequency bandwidth limitations as for the parabolic dishes.

SUMMARY OF INVENTION

A system and method in accordance with the present invention exploit the canonical (natural) "dual-circular" nature of a single linear polarization to provide a simple and low-cost means for supporting dual polarization functionality in support of inter-beam satellite handoffs. In accordance with the invention, a polarizer's normal (single) polarization states are used in combination with the polarizer's unused "inert" (linear) state to selectively switch between a singular polarization state (e.g., LHCP or RHCP) to a dual polarization state (e.g., LHCP and RHCP).

According to one aspect of the invention, a method for providing simultaneous dual polarization operation using a linearly-polarized planar antenna and a polarizer spaced apart from the linearly-polarized planar antenna is disclosed. The polarizer includes a first polarization state comprising primarily left-hand circular polarization (LHCP), a second polarization state comprising primarily right-hand circular polarization (RHCP), and a third polarization state comprising linear polarization from which a combination of both LHCP and RHCP is simultaneously derived. The method includes: placing the polarizer in the first or second polarization state to at least one of transmit or receive a signal having primarily one of LHCP or RHCP, respectively; and placing the polarizer in the third polarization state to simultaneously transmit and/or receive two different signals, a first signal of the two different signals having primarily LHCP and a second signal of the two different signals having primarily RHCP.

In one embodiment, the method includes providing seamless coverage for an electronic device transitioning between adjacent spot beams by placing the polarizer in the first polarization state or the second polarization state based on a type of polarization employed by a spot beam serving an area in which the electronic device resides; and placing the polarizer in the third polarization state when the electronic device is in an area serviced by two spot beams that employ different polarizations.

In one embodiment, spot beam transmission patterns employ a first polarization state and an overlay transmission pattern employs a second polarization state different from the first polarization state, the method further including providing simultaneous reception of spot beam transmission patterns and overlay transmission patterns by placing the polarizer in the third polarization state.

In one embodiment, placing the polarizer in the third polarization state comprises placing the polarizer in a state that emphasizes one of LHCP or RHCP over the other of LHCP or RHCP.

In one embodiment, placing the polarizer in a state that emphasizes one of LHCP or RHCP over the other of LHCP or RHCP includes: determining a distance of the electronic device from a nearest outer boundary of each of the two spot beams; determining a polarization of the spot beam having an outer boundary that is farthest away from a location of the electronic device; and placing the polarizer in a state that emphasizes a polarization of the spot beam having the outer boundary that is farthest away from the location of the electronic device.

In one embodiment, placing the polarizer in a state that favors one of LHCP or RHCP over the other of LHCP or RHCP includes basing the favored polarizer state on a polarity of the spot beam.

In one embodiment, the second polarization state is strictly one of LHCP or RHCP.

In one embodiment, the first polarization state is strictly one of LHCP or RHCP.

In one embodiment, the method includes using at least one of a meander-line polarizer, a rotary-vane polarizer, an orthomode transducer polarizer, or a quarter-wave plate polarizer to provide each polarization state.

In one embodiment, using includes using the meander-line polarizer, wherein the meander-line polarizer comprises a plurality of meander-lines and the linearly-polarized planar antenna comprises an aperture, and wherein placing the polarizer in the third polarization state comprises orienting a longitudinal axis of the plurality of meander-lines parallel to the polarization orientation of the E-field of the aperture.

In one embodiment, using includes using the meander-line polarizer, wherein the meander-line polarizer comprises a plurality of meander-lines and the linearly-polarized planar antenna comprises an aperture, and wherein placing the polarizer in the third polarization state comprises orienting a longitudinal axis of the plurality of meander-lines perpendicular to the polarization orientation of the E-field of the aperture.

In one embodiment, the meander-line polarizer comprises a plurality of meander-lines and the linearly-polarized planar antenna comprises an aperture, and wherein placing the polarizer in the first or second polarization state comprises orienting a longitudinal axis of the plurality of meander-lines at a non-zero angle with respect to a polarization orientation of the aperture.

In one embodiment, the non-zero angle is one of approximately 45 degrees or approximately −45 degrees.

According to another aspect of the invention, a system for providing dual polarization functionality includes: a linearly-polarized planar antenna having an aperture; a polarizer spaced apart from the linearly-polarized planar antenna, the polarizer including a first polarization state comprising primarily one of left-hand circular polarization (LHCP) or right-hand circular polarization (RHCP), and a third polarization state comprising linear polarization derived from a combination of LHCP and RHCP; a controller operatively coupled to the polarizer, the controller configured to place the polarizer in the first polarization state to provide primarily one of LHCP operation or RHCP operation, and place the polarizer in the third polarization state to provide simultaneous LHCP and RHCP operation.

In one embodiment, the polarizer further includes a second polarization state comprising primarily one of the other of LHCP or RHCP.

In one embodiment, the polarizer includes a motive device communicatively coupled to the controller and operative to selectively position the polarizer relative to the aperture, wherein the controller is configured to selectively command the motive device to position the polarizer relative to the aperture to produce any one of the polarization states.

In one embodiment, the motive device is operative to change an angular relationship between the aperture and the polarizer.

In one embodiment, the polarizer includes a meander-line polarizer.

In one embodiment, the meander-line polarizer includes a plurality of meander-lines, and the controller is configured to place the polarizer in the third polarization state by commanding the motive device to orient a longitudinal axis of the plurality of meander-lines parallel to the polarization orientation of the E-field of the aperture.

In one embodiment, the meander-line polarizer includes a plurality of meander-lines, and the controller is configured to place the polarizer in the third polarization state by commanding the motive device to orient a longitudinal axis of the plurality of meander-lines perpendicular to the polarization orientation of the E-field of the aperture.

In one embodiment, the meander-line polarizer includes a plurality of meander-lines, and wherein the controller is configured to place the polarizer in the first polarization state by commanding the motive device to orient a longitudinal axis of the plurality of meander-lines at a non-zero angle with respect to a polarization orientation of the aperture.

In one embodiment, the non-zero angle is one of approximately 45 degrees or approximately −45 degrees.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DETAILED DESCRIPTION OF INVENTION

Figure 1A:
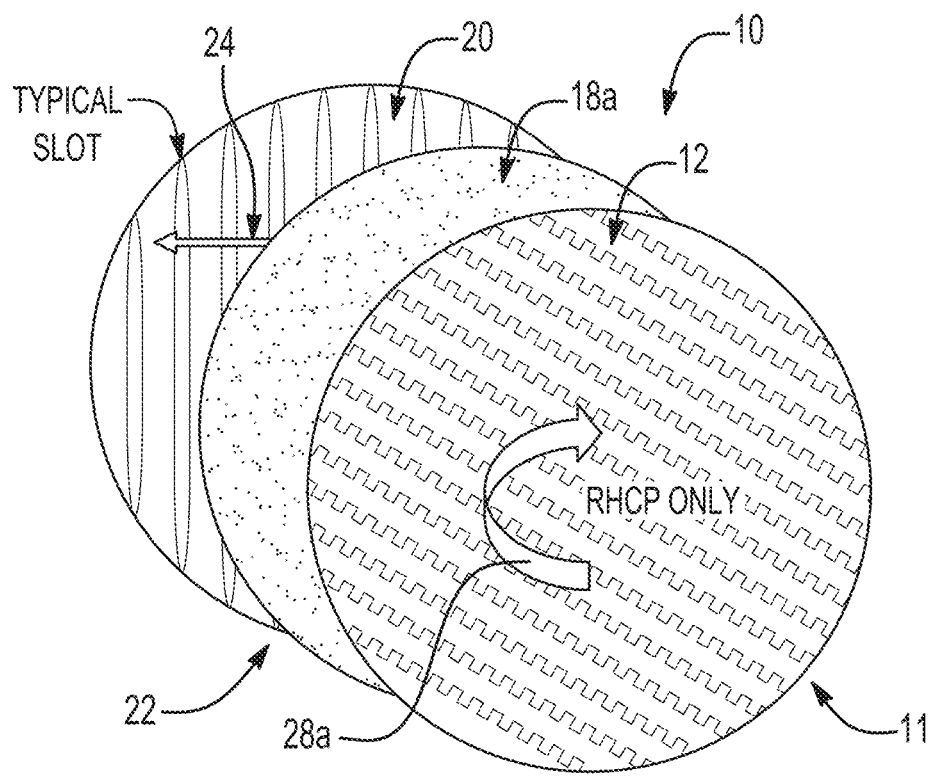
FIG. 1A illustrates a typical orientation and senses of polarization incident upon and exiting from a polarizing layer when converting incident linear polarization to RHCP circular polarization through the meander-line polarizer (RHCP only "activated" condition).

Embodiments of the present invention will now be described with reference to the drawings, wherein like reference numerals are used to refer to like elements throughout. It will be understood that the figures are not necessarily to scale.

Additionally, the present invention will be described in the context of a meander-line polarizer. However, principles of the invention are applicable to other types of polarizers, non-limiting examples of which include a rotary-vane polarizer, an orthomode transducer polarizer, a quarter-wave plate polarizer, and the like.

A system and method in accordance with the invention enable implementation of a simple switchable single polarization antenna system that is switchable between RHCP OR LHCP polarization sense. Further, the system and method in accordance with the invention enable operation (temporarily, as required) as a more capable simultaneous dual-polarization antenna system in both RHCP AND LHCP polarization senses, thereby allowing for increased flexibility and functionality in advanced spot beam and spot/overlay satellite user-terminal applications.

In accordance with the invention, by utilizing "intermediate" positioning of a polarization switching mechanism to place the polarizer in an intermediate (inert) state, a switchable-polarization antenna system can uniquely support simultaneous dual circular polarization. As used herein, an "intermediate" position refers to a position that is between polarization states. For example, if a first polarization state (e.g., LHCP) is achieved by orienting a component of the polarizer in a first position, and a second polarization state (e.g., RHCP) is achieved by orienting the component of the polarizer in a second, different position, the intermediate position is a position between the first position and the second position, preferably midway between the two positions. Some variation on either side of the mid-point, however, is considered within the scope of the invention (e.g., 15 percent on either side of the midpoint). Utilizing the intermediate (inert) state enables use of the antenna system for receiving and transmitting radio frequency electromagnetic (RF) signals in a much broader range of applications. In this regard, the system and method in accordance with the invention exploit the fact that a single linear polarization signal is a special case superposition of two (simultaneous orthogonal (opposite sense) circular polarization signals (RHCP and LHCP.)

A conventional "meander-line" polarizer is typically (solely) used for converting linear polarization of a linearly-polarized planar antenna to one (or another) sense of circular polarization (either RHCP or LHCP.) It is well known that these two distinct (orthogonal) circular polarization senses can be realized by rotational orientation of the meander-line polarizer "traces," oriented approximately 45 degrees clockwise (for RHCP) or approximately 45 degrees counter-clockwise (for LHCP) relative to the linear-polarization of the planar antenna to which it is attached. In this way, the polarizer is "switchable" between RHCP and LHCP polarization senses (if a rotational actuating mechanism is employed.) However, this same mechanism has the ability to orient the meander-line traces to either 0 degrees (parallel) or 90 degrees (perpendicular) relative to the aperture. This is a novel non-conventional ("inert") use of the meander-line polarizer, generally NOT viewed as beneficial use, in that the polarization of the linear polarization planar antenna is left unchanged (i.e. in these two intermediate states, the meander-line polarizer is thought to "serve no useful function".) However, based on the aforementioned observation that these "useless" intermediate (linear-polarization) states equate to neither pure-LHCP nor pure-RHCP, but rather dual simultaneous LHCP and RHCP, with the utility of then enabling beneficial "dual circular polarization" applications (albeit with a reduction in antenna gain performance while operating in the intermediate "dual" mode.)

The synthesis of a variable circularly polarized signal is made possible by employing a meander-line polarizer proximal to a linearly-polarized planar antenna aperture. As discussed in further detail below, a meander-line polarizer is typically realized as a multi-layer laminated structure, with conductive meander-line patterns etched on each of the "stacked" dielectric substrate surfaces. A linear field interacting with these meander patterns will have its normal and parallel field components inductively and capacitively loaded based on the orientation of the meander-line patterns. When these meander-line polarizer patterns (the axis of the meander-line "traces") are oriented 45/−45 degrees with respect to the linear aperture of the antenna, the transmitting field is an ideal right-hand (RHCP) or left-hand (LHCP) circular field, where the aspect ratio of the major and minor axis is unity. Less conventionally recognized, when the meander-line polarizer is oriented/positioned at 0 or 90 degrees relative to the linearly-polarized orientation of the planar antenna, the resultant polarized field becomes highly elliptical, effectively a linearly polarized field. This linearly polarized field includes both LHCP and RHCP components.

Figure 1B:
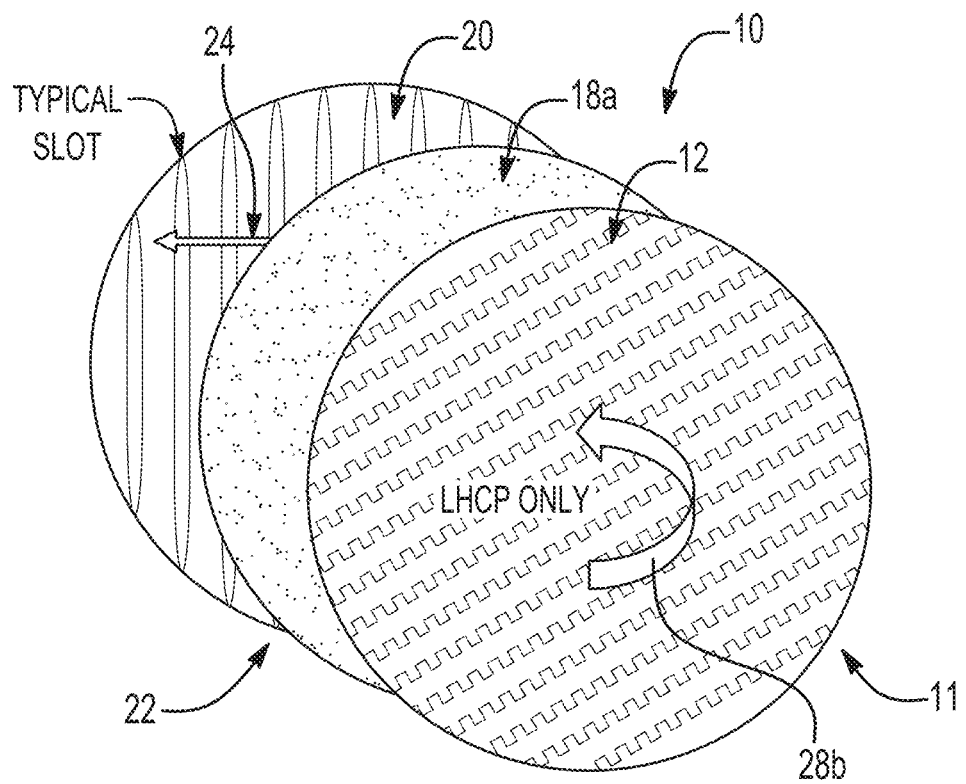
FIG. 1B illustrates a typical orientation and senses of polarization incident upon and exiting from a polarizing layer when converting incident linear polarization to LHCP circular polarization through the meander-line polarizer (LHCP only "activated" condition).
Figure 1C:
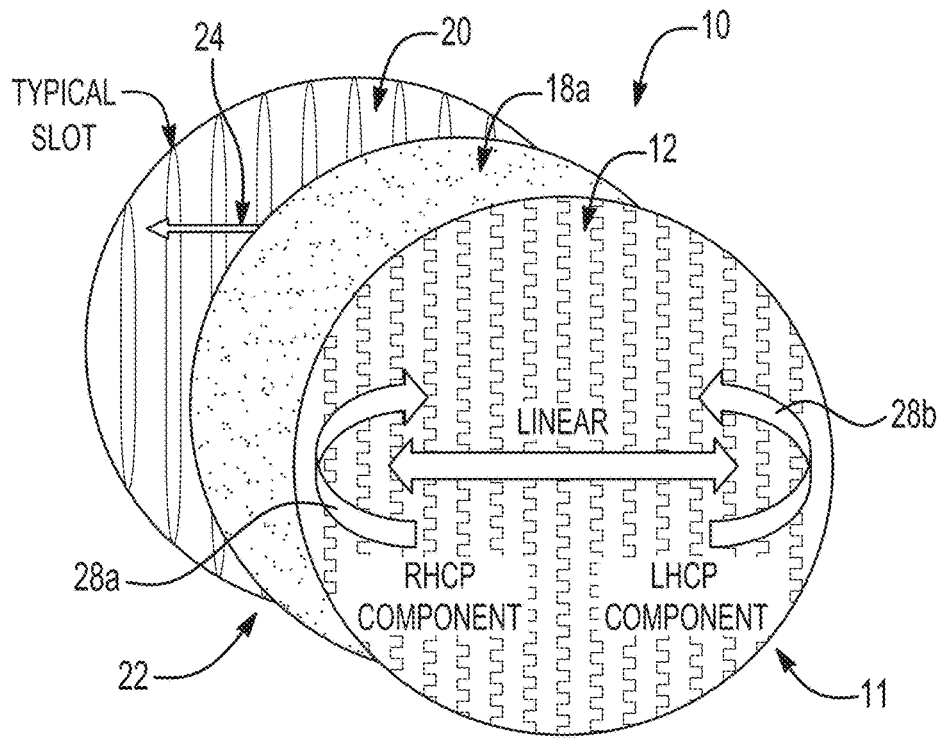
FIG. 1C illustrates the intermediate orientation and senses of polarization incident upon and exiting from a polarizing layer when converting incident linear polarization to linear polarization through the meander-line polarizer (RHCP and LHCP, "inert" condition).

Referring now to FIGS. 1A-1C, illustrated is a top exploded view of an exemplary antenna system 10 that may be used in connection with the present invention, the antenna system 10 including a polarizer 11 for selectively switching between LHCP, RHCP and linear polarization. FIGS. 1A and 1B illustrates the polarizer 11 configured for circular polarization (LHCP or RHCP), and FIG. 1C illustrates the polarizer configured for the "inert" state (linear polarization from which a combination of both LHCP and RHCP is simultaneously derived).

The antenna system 10 includes an antenna with a linearly-polarized aperture 20 for transmitting and receiving a signal. In the illustrated embodiment the linearly-polarized aperture 20 is a variable inclination continuous transverse stub (VICTS) antenna. However, the system and method in accordance with the invention can be used with other types of linearly-polarized apertures.

The exemplary polarizer 11 of FIGS. 1A-1C comprises a meander-line polarizer 12 spaced apart from the linearly polarized aperture 20 to define a gap 22 formed between the meander-line polarizer 12 and the aperture 20. Air or a foam spacer 18a resides in the gap 22. A purpose of the optional foam spacer 18a, which may be formed from low-density foam, is to maintain a constant spacing between the meander-line polarizer 12 and the aperture 20, however other methods of maintaining such spacing are possible.

Figure 2:
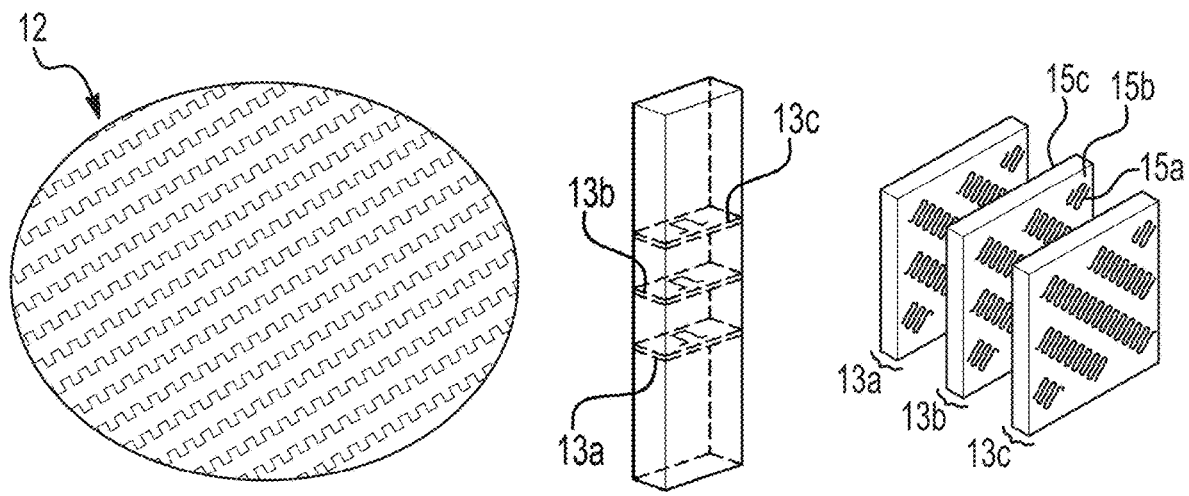
FIG. 2 shows a typical construction and cross-section of a representative meander-line polarizer.

Referring briefly to FIG. 2, illustrated is a perspective view along with section views of an exemplary meander-line polarizer 12 that may be used with the system and method in accordance with the invention. The exemplary meander-line polarizer 12 has a circular form factor to facilitate rotation of the meander-line polarizer and the antenna aperture 20 about a common axis. A benefit of using a circular form factor is that it ensures the surface area of the meander-line polarizer, when the polarizer is arranged on a common axis through the center of the aperture 20, completely overlap regardless of the angular orientation of the polarizer relative to the aperture. The exemplary meander-line polarizer of FIG. 2 is formed from three individual layers, 13a, 13b, 13c, each layer arranged parallel to the other and spaced apart by a preset distance. Each layer includes a plurality of meander-line traces 15a formed on a substrate 15b, with a spacer 15c arranged between adjacent substrates. While the exemplary meander-line polarizer 12 of FIG. 2 includes three layers, it is possible to utilize a meander-line polarizer 12 with less layers (e.g., two layers) or more than three layers (e.g., four, five, six or more layers.)

Meander-line polarizers are generically designed to provide the typical "quadrature" (90 degree) differential transmission phase difference between parallel and perpendicular incident linearly-polarized wave components, relative to a common axes of the meander-line traces 15a. In this manner, incident linear polarization is converted to circular polarization when the incident linear polarization is oriented at approximately +45 or −45 degrees relative to these axes (thereby presenting approximately equal magnitudes of parallel and perpendicular field components.) As used herein, reference to an "approximate" angular orientation includes the specified angular orientation plus or minus 15 degrees. Thus, "approximately +45 degrees or −45 degrees" includes +60 to +30 degrees or −30 degrees to −60 degrees, respectively.

With continued reference to FIGS. 1A-1C, for a desired (resultant) CIRCULAR polarization from the polarizer, the polarizer 12 is rotated/oriented such that a longitudinal axis of the meander-lines of the polarizer 12 are approximately +45 or −45 degrees relative to the "natural" polarization 24 (also referred to as the E-field) of the antenna aperture 20.

For example, for a desired RHCP 28a as shown in FIG. 1A, the polarizer 12 is rotated/oriented such that the longitudinal axis of the meander-lines of the polarizer 12 are approximately +45 degrees relative to the "natural" polarization 24 of the antenna aperture 20. This essentially "activates" the polarizer 12 such that it converts the intrinsic linear polarization of the aperture 20 to RHCP. For a desired LHCP 28b as shown in FIG. 1B, the polarizer 12 is rotated/ oriented such that the longitudinal axis of the meander-lines of the polarizer 12 are approximately −45 degrees relative to the natural polarization 24 of the antenna aperture 20. This essentially "activates" the polarizer 12 such that it converts the intrinsic linear polarization of the aperture 20 to LHCP 28b.

FIG. 1C illustrates the meander-lines of the inner polarizer at approximately 0 degrees relative to the natural polarization 24 of the antenna aperture 20. This essentially "deactivates" the polarizer 12 such that it has no primary polarization impact (i.e., the inert condition). As a result, linear-polarization is passed through and unchanged from the linear polarized aperture 20.

Figure 3:
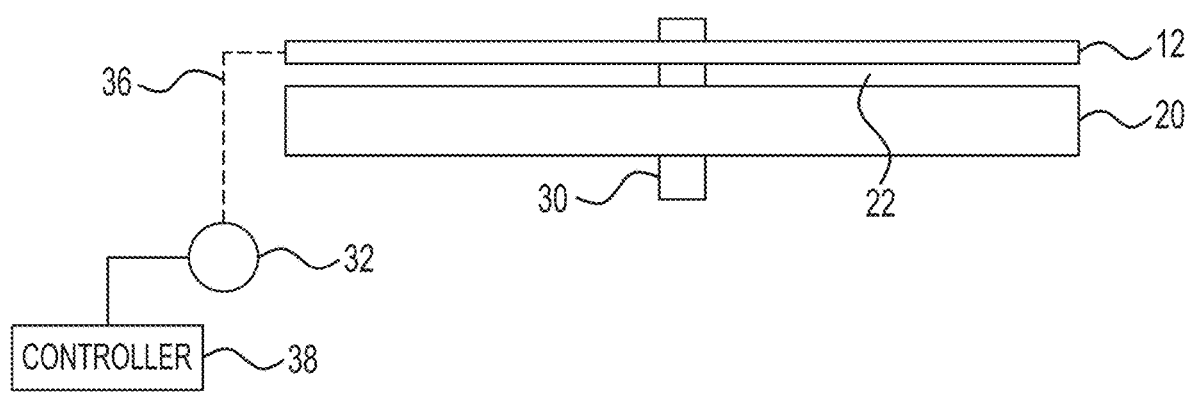
FIG. 3 is a schematic diagram illustrating a system for providing relative rotation between the meander-line polarizer and the antenna aperture.

Independent motion control of the meander-line polarizer 12 relative to the aperture 20 ensures that the desired polarization can be achieved. Such motion can be accomplished by direct drive, gear drive, belt drive, or other common rotation methods in order to change an angular relationship between the aperture and the polarizer. For example, and briefly referring to FIG. 3, the polarizer 12 may be mounted on a spindle 30 and rotatable about the spindle, and a motive device 32 may be drivingly coupled to the meander-line polarizer 12. The motive device 32 may be an electric motor, for example, or like device, and may be coupled to the polarizer via a drive coupler 36, such as a belt drive, a gear drive, a screw drive, spindle drive or the like. A controller 38, which includes, for example, a processor and memory or an application specific integrated circuit, is configured to implement a method in accordance with the invention. The controller 38 communicates with the actuator 32 to rotate the polarizer 12 to produce desired orientations (e.g., the controller is configured to selectively command the motive device(s) to position the polarizer relative to the aperture to produce any one of the polarization.) One or more feedback devices (not shown) operatively coupled to the polarizer 12 and communicatively coupled to the controller 38 enable closed loop position control.

In accordance with the invention, and as described in further detail below, the described meander-line polarizer is employed in a novel non-conventional manner to exploit the intermediate "inert" rotation angles and temporarily realize simultaneous dual circular polarization. The system and method in accordance with the invention "boosts" the capability of a much simpler, less complex, less bulky, and less expensive single fixed linear polarization antenna to provide not only RHCP or LHCP polarization, but also dual simultaneous RHCP and LHCP polarization senses.

Figure 4:
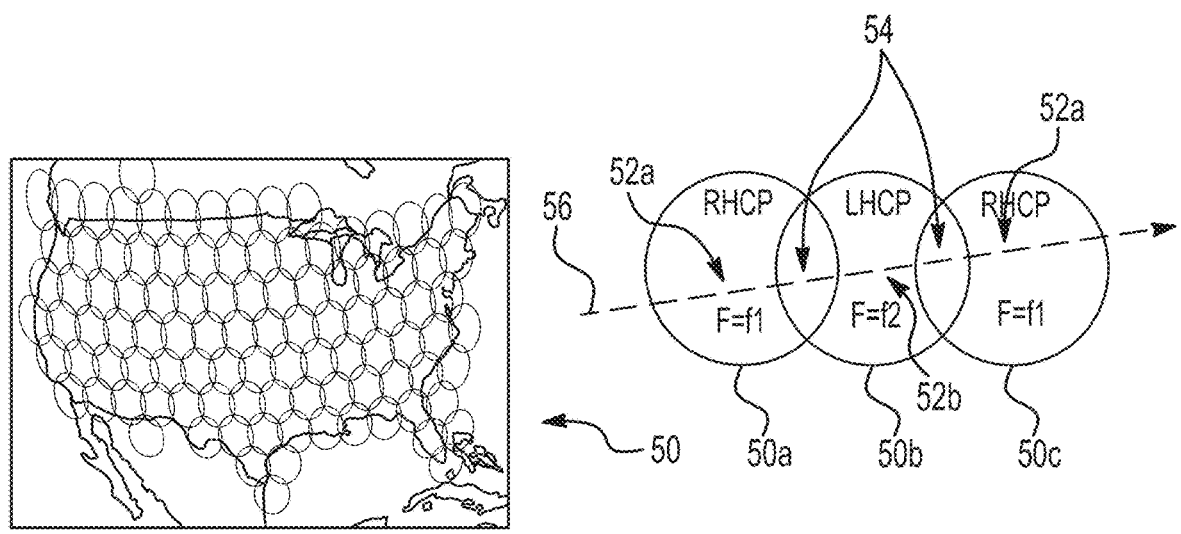
FIG. 4 illustrates an exemplary use case in which seamless coverage is provided while a mobile user transitions between adjacent spot beams in accordance with the invention.

There are existing satellite networks that use polarization, in addition to frequency, to differentiate communication signals. For example, and with reference to FIG. 4, illustrated is an exemplary application in which cell coverage of the United States is provided via multiple spot beams 50, each spot beam utilizing LHCP or RHCP and an operating of frequency f1 or f2. In many instances, adjacent spot beams utilize the same frequency and polarization, e.g., f1 and LHCP, and therefore the transition of a mobile device between such spot beams requires no change in polarization or frequency. However, due to interference in a specific region or for other reasons, it may be advantageous to use a different polarization and frequency (e.g., RHCP and f2) relative to the adjacent spot beam(s). Thus, in certain instances two or more adjacent spot beams 50a, 50b, 50c may have different polarizations and operate at different frequencies. For example, in FIG. 4 spot beams 50a and 50c may operate with RHCP 52a and frequency f1 and spot beam 50b may operate with LHCP 52b and at frequency f2.

As can be seen in FIG. 4, the adjacent spot beams have regions of overlap, and when such overlap occurs between spot beams having different polarizations, zones of "dual polarization" 54 are created. As a mobile device moves along a path 56, the mobile device transitions from spot beam 50a to spot beam 50b and then to spot beam 50c. As a result, the mobile device must adapt to the change in polarization at each spot beam, and in particular must be capable of simultaneous LHCP and RHCP in the overlapping regions in order to connect to both beams simultaneously (and thus enable seamless transfer between beams).

Figure 5:
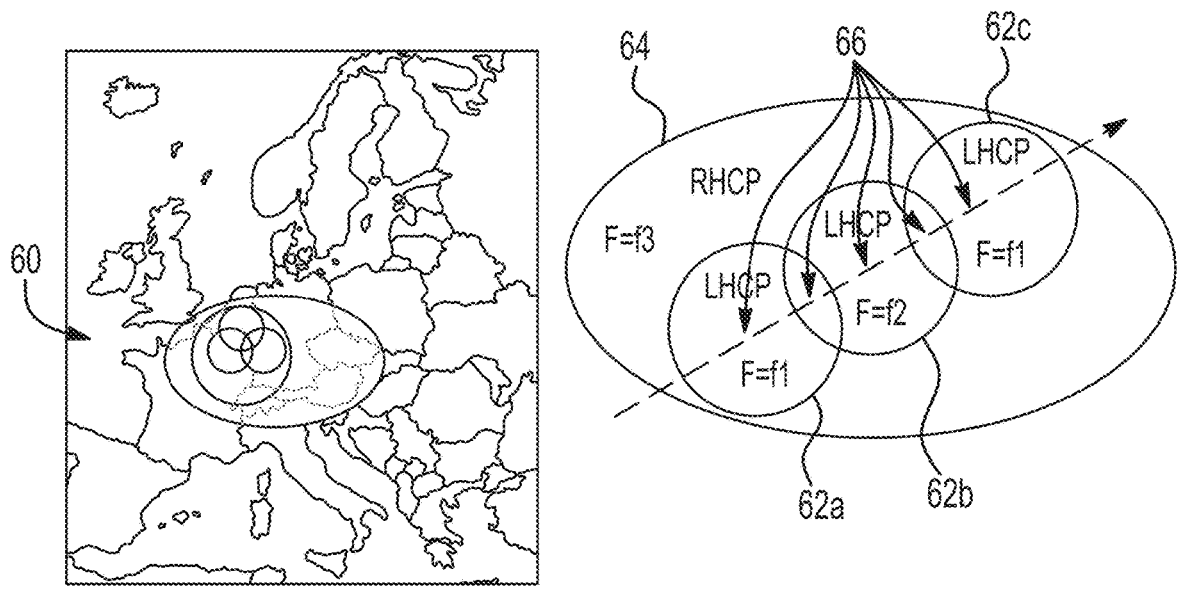
FIG. 5 illustrates another exemplary use case in which simultaneous reception of both RHCP (Broadcast overlay) and LHCP (internet spot beam) is provided in accordance with the invention.

Referring now to FIG. 5, illustrated is another application in which a mobile device requires simultaneous LHCP and RHCP in overlapping regions 60. In this example, "narrow" spot beams 62a, 62b, 62c provide, for example, cellular communication capability while a "wide" overlay beam 64 provides broadcast capability. In the example of FIG. 5, the spot beams 62a, 62b, 62c operate using the same polarity, e.g., LHCP, with different frequencies f1, f2, while the broadcast overlay beam 64 operates using a polarity and frequency different from the spot beams, e.g., RHCP and f3. As a mobile device moves along a path 66 as shown in FIG. 5, the mobile device must be capable of receiving the different polarization signals in order to provide both broadcast reception and cellular communication functions.

Figure 6:
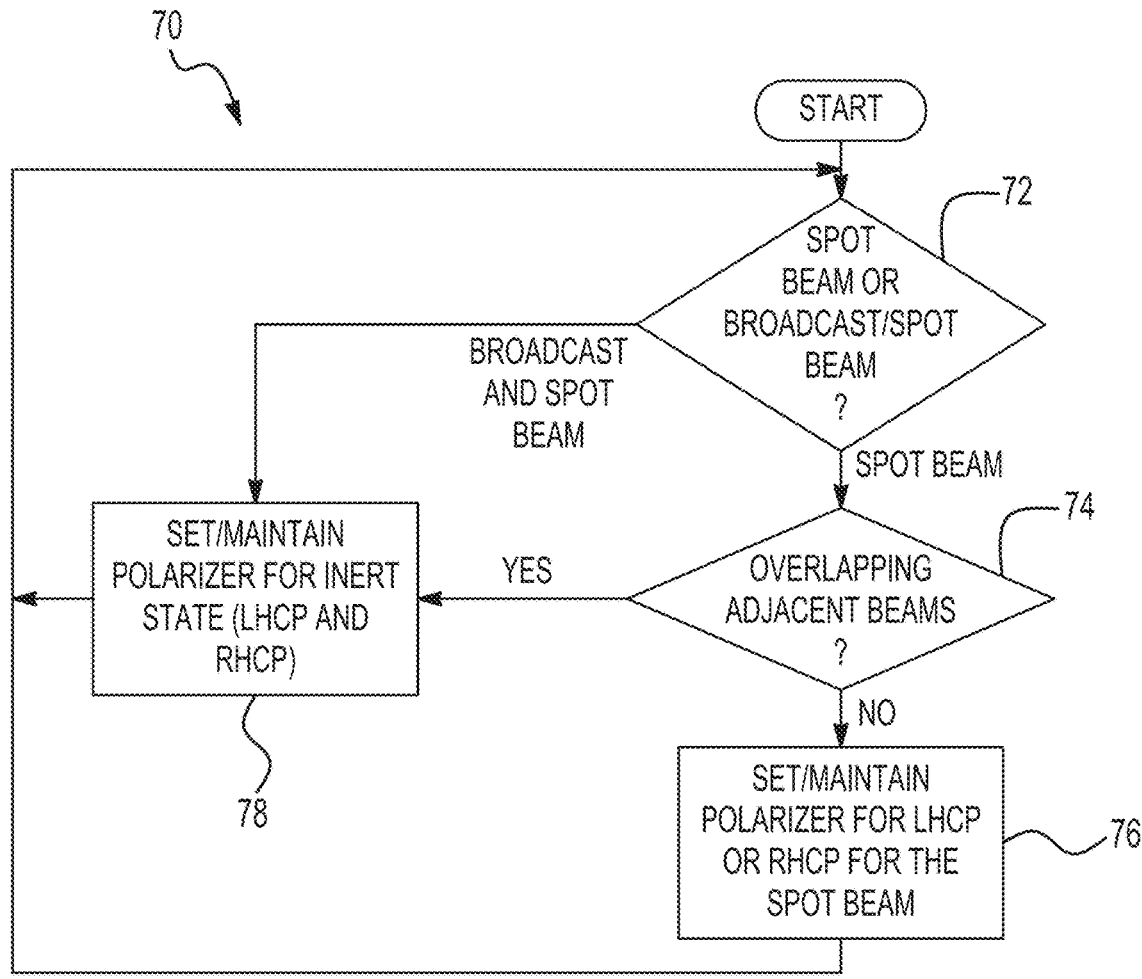
FIG. 6 is a flow chart illustrating exemplary steps of a method in accordance with the invention.

The system and method in accordance with the invention can exploit the satellite network examples of FIGS. 5 and 6 to support instantaneous dual polarization for multi-channel communication using a simple and inexpensive polarizer. As will be described below with respect to FIG. 6, the system and method in accordance with the invention enable simultaneous LHCP and RHCP operation to provide seamless transition between adjacent spot beams having different polarizations and frequencies, and can do so in a highly cost-effective manner.

Referring now to FIG. 6, illustrated is an exemplary method 70 for providing simultaneous dual polarization operation in accordance with the invention. The method may be performed using a linearly-polarized planar antenna and a polarizer spaced apart from the linearly-polarized planar antenna, where the polarizer includes a first polarization state having primarily left-hand circular polarization (LHCP), a second polarization state having primarily right-hand circular polarization (RHCP), and a third polarization state having linear polarization from which a combination of both LHCP and RHCP is simultaneously derived. As used herein, "primarily" a first or second polarization state is defined as the signal is greater than or equal to 95 percent pure. Additionally, as used herein "strictly" LHCP or RHCP is defined as the signal is greater than or equal to 99 percent pure. One or more of the steps illustrated in FIG. 6 may be executed by the controller 38.

Beginning at step 72, it is determined if the mobile device will be connecting to signals provided only by spot beams or to signals provided by a combination of spot beams and a broadcast overlay. Such determination may be made, for example, based on a mode of operation of the mobile device. For example, if the mobile device is not operating in a broadcast receive mode, then it may be determined that the mobile device will only need to connect to spot beams. Conversely, if the mobile device is operating on in a broadcast receive mode, then it may be determined that the mobile device will need to connect to both the broadcast overlay and the spot beam(s).

If the mobile device is only to connect to spot beams, then at step 74 it is determined if the mobile device is in a region in which the signal is supplied by a single spot beam, or by overlapping spot beams that use different polarizations (e.g., an overlap region). Such determination may be made based on a detected geographical location of the mobile device (which may be obtained from a GPS) in combination with coverage data that details the service for the geographical location. Such coverage data may be pre-stored on the mobile device or retrievable by the mobile device from a remote location. Based on the position data obtained from the GPS and the coverage data, a determination can be made if the mobile device is in an overlap region serviced by multiple spot beams operating with different polarities, or in a non-overlap region or overlap region serviced by multiple spot beams operating with the same polarity.

If it is determined that the mobile device is not in an overlap region (or is in an overlap region serviced by spot beams operating with the same polarity), the method moves to step 76 where the polarizer is placed in the first or second polarization state to provide primarily one of LHCP or RHCP. For example, if the polarizer is embodied as a meander-line polarizer that includes a plurality of meander-lines and the linearly-polarized planar antenna includes an aperture, then the polarizer may be placed in the first polarization state by orienting a longitudinal axis of the plurality of meander-lines at a non-zero angle with respect to a polarization orientation of the aperture (e.g., approximately 45 degrees or approximately −45 degrees relative to the natural polarization of the aperture). Selection of the first or second polarization state is based on a type of polarization employed by a spot beam serving an area in which the mobile device resides. Such orientation enables the mobile device to connect to a spot beam having primarily one of LHCP or RHCP. The method then moves back to step 72 and repeats.

Moving back to step 74, if the mobile device is in an overlap region serviced by spot beams operating with different polarities, then at step 78 the polarizer is placed in the third "inert" polarization state to enable simultaneous transmission and/or reception of two different polarization signals, where a first signal of the two different signals has primarily LHCP and a second signal of the two different signals has primarily RHCP. For example, if the polarizer is embodied as a meander-line polarizer that has a plurality of meander-lines and the linearly-polarized planar antenna includes an aperture, then the polarizer may be placed in the third polarization state by orienting a longitudinal axis of the plurality of meander-lines parallel to the polarization orientation of the E-field of the aperture. Alternatively, the polarizer may be placed in the third polarization state by orienting a longitudinal axis of the plurality of meander-lines perpendicular to the polarization orientation of the E-field of the aperture. In this manner, both LHCP and RHCP signals can be received and/or transmitted by the mobile device. This provides seamless coverage for a mobile device transitioning between adjacent spot beams that employ different polarizations. The method then moves back to step 72 and repeats.

Moving back to step 72, if the mobile device is to receive signals from spot beams and the broadcast overlay, then the method moves to step 78 as described above and the polarizer is set in the inert positon (both LHCP and RHCP). This provides simultaneous reception of spot beam transmission patterns and overlay transmission patterns in regions where the overlay beam employs a different polarization from that of the spot beams. The method then moves back to step 72 and repeats.

The system and method in accordance with the present invention provide seamless transitioning of a user device between i) adjacent spot beams that operate using different polarities and ii) spot beams that overlap with a broadcast overlay beam that operate using different polarities. However, the transitioning method does have a slight drawback in that there is a gain loss (3 dB) while operating under dual (LHCP and RHCP) polarization mode. This 3 dB gain loss is applied to both the LHCP signal and the RHCP signal (assuming the polarizer is set in the completely inert state, e.g., for a meander-line polarizer the meander-lines are set at 0 or 90 degrees with respect to the natural polarization of the aperture).

In some instances, it may be advantageous to bias the level of polarization to favor one of LHCP or RHCP over the other in order to better accommodate the relative signal strengths/gains of the two overlapping beams (i.e., the overlapping regions between adjacent spot beams, or spot beams overlapping a broader broadcast beam). This can be beneficial when the particular location within the overlapping region between adjacent beams is farther from one boundary than the other (e.g., the mobile device/user is not in the "middle" of an overlapping region, but instead is closer to the center of one spot beam than the center of the other), in which case the signal is higher for the "closer to center" spot beam. In the case of spot beams overlapping with broadcast beams, it is often the case that the broadcast beam can be adequately received at a lower gain level/threshold than what is required for reliable operation in the spot beam.

The above imbalanced "apportionment" between LHCP and RHCP can be exploited by biasing the rotation angle of the polarizer to favor (be closer to) one circular polarization position as compared to the other (i.e., purposefully NOT at exactly 0 or 90 degree rotation.) For example, rather than suffering 3 dB loss in each of the two polarization states (RHCP and LHCP, with 50% loss allocated to one and 50% loss allocated to the other) as would be the case with the polarizer set to an "exact inert" rotation position of 0 or 90 degrees, a 27 degree CW rotation (rather than 0 degrees), roughly half-way between the conditions/orientations shown in FIGS. 1B and 1C, respectively, would provide for a different apportionment (80% LHCP, 20% RHCP, for this specific example) that "favors" (emphasizes) the LHCP over the RHCP, with the LHCP suffering a smaller (1 dB, i.e. 20%) loss while the RHCP suffers a larger (7 dB, i.e. 80%) loss. In practice, this (re)apportionment can be continuously controlled as the user transitions between beams (or conversely, the beams transition between the user device).

The present invention finds particular utility in commercial and non-commercial satellite communication terminals for which highly flexible polarization capabilities provide for a single common antenna/terminal (enabled with polarization diverse capabilities) to support a broad(er) range of satellite types, including both Geosynchronous Orbit (GSO) and non-Geosynchronous Orbit (NGSO) varieties (which typically require different types of antenna polarizations and orientations.) Similarly, Terrestrial communication radios/terminals and High-Performance Radar Systems (employing diverse polarizations for enhance properties) would also benefit.

Additionally, and as alluded to above, while FIGS. 5 and 6 illustrate two applications in which a moving user (e.g., an aircraft, a vehicle, a mobile phone, a tablet computer, etc.) transitions between fixed (static) beams emanating from fixed GSO satellites, aspects of the invention are also applicable to the opposite condition. More specifically, in the case of NGSO satellites, the beams emanating from each NGSO satellite is moving relative to the earth's surface while the user may be positionally fixed relative to the earth's surface (i.e., the user is not moving or not moving a significant distance relative to the beam width). In this scenario, the method and system in accordance with the invention can be utilized in the same manner as the GSO satellite/roaming user example discussed above to provide seamless transition between beams.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

What is claimed is:

1. A method for providing simultaneous dual polarization operation using a linearly-polarized planar antenna and a polarizer spaced apart from the linearly-polarized planar antenna, the polarizer including a first polarization state comprising primarily left-hand circular polarization (LHCP), a second polarization state comprising right-hand circular polarization (RHCP), and a third intermediate polarization state comprising linear polarization from which a combination of both LHCP and RHCP is simultaneously derived, the method comprising:

placing the polarizer in the first or second polarization state to at least one of transmit or receive a signal having primarily one of LHCP or RHCP, respectively;

placing the polarizer in the third intermediate polarization state to simultaneously transmit and/or receive two different signals, a first signal of the two different signals having primarily LHCP and a second signal of the two different signals having primarily RHCP; and communicating an RF signal between the linearly-polarized planar antenna and a remotely-located terminal while the polarizer is in the third intermediate polarization state.

2. The method according to claim 1, further comprising providing seamless coverage for an electronic device transitioning between adjacent spot beams by placing the polarizer in the first polarization state or the second polarization state based on a type of polarization employed by a spot beam serving an area in which the electronic device resides; and placing the polarizer in the third intermediate polarization state when the electronic device is in an area serviced by two spot beams that employ different polarizations.

3. The method according to claim 1, wherein placing the polarizer in the third intermediate polarization state comprises placing the polarizer in a state that emphasizes one of LHCP or RHCP over the other of LHCP or RHCP.

4. The method according to claim 3, wherein placing the polarizer in a state that emphasizes one of LHCP or RHCP over the other of LHCP or RHCP comprises:

determining a distance of the electronic device from a nearest outer boundary of each of two adjacent spot beams;

determining a polarization of the spot beam having an outer boundary that is farthest away from a location of the electronic device; and placing the polarizer in a state that emphasizes a polarization of the spot beam having the outer boundary that is farthest away from the location of the electronic device.

5. The method according to claim 3, wherein placing the polarizer in a state that favors one of LHCP or RHCP over the other of LHCP or RHCP includes basing the favored polarizer state on a polarity of a spot beam serving an area in which the electronic device resides.

6. The method according to claim 1, wherein the second polarization state is strictly one of LHCP or RHCP.

7. The method according to claim 1, wherein the first polarization state is strictly one of LHCP or RHCP.

8. The method according to claim 1, further comprising using at least one of a meander-line polarizer, a rotary-vane polarizer, an orthomode transducer polarizer, or a quarter-wave plate polarizer to provide each polarization state.

9. The method according to claim 8, wherein using comprises using the meander-line polarizer, wherein the meander-line polarizer comprises a plurality of meander-lines and the linearly-polarized planar antenna comprises an aperture, and wherein placing the polarizer in the third intermediate polarization state comprises orienting a longitudinal axis of the plurality of meander-lines parallel to the polarization orientation of the E-field of the aperture.

10. The method according to claim 8, wherein using comprises using the meander-line polarizer, wherein the meander-line polarizer comprises a plurality of meander-lines and the linearly-polarized planar antenna comprises an aperture, and wherein placing the polarizer in the third intermediate polarization state comprises orienting a longitudinal axis of the plurality of meander-lines perpendicular to the polarization orientation of the E-field of the aperture.

11. The method according to claim 8 wherein the meander-line polarizer comprises a plurality of meander-lines and the linearly-polarized planar antenna comprises an aperture, and
wherein placing the polarizer in the first or second polarization state comprises orienting a longitudinal axis of the plurality of meander-lines at a non-zero angle with respect to a polarization orientation of the aperture.

12. A method for providing simultaneous dual polarization operation using a linearly-polarized planar antenna and a polarizer spaced apart from the linearly-polarized planar antenna, the polarizer including a first polarization state comprising primarily left-hand circular polarization (LHCP), a second polarization state comprising right-hand circular polarization (RHCP), and a third intermediate polarization state comprising linear polarization from which a combination of both LHCP and RHCP is simultaneously derived, the method comprising:
placing the polarizer in the first or second polarization state to at least one of transmit or receive a signal having primarily one of LHCP or RHCP, respectively;
placing the polarizer in the third intermediate polarization state to simultaneously transmit and/or receive two different signals, a first signal of the two different signals having primarily LHCP and a second signal of the two different signals having primarily RHCP, wherein spot beam transmission patterns employ a first polarization state and an overlay transmission pattern employs a second polarization state different from the first polarization state, the method further comprising providing simultaneous reception of spot beam transmission patterns and overlay transmission patterns by placing the polarizer in the third intermediate polarization state.

13. The method according to claim 11, wherein the non-zero angle is one of approximately 45 degrees or approximately −45 degrees.

14. A system for providing dual polarization functionality, comprising:
a linearly-polarized planar antenna having an aperture;
a polarizer spaced apart from the linearly-polarized planar antenna, the polarizer including a first polarization state comprising primarily one of left-hand circular polarization (LHCP) or right-hand circular polarization (RHCP), and a third intermediate polarization state comprising linear polarization derived from a combination of LHCP and RHCP;
a controller operatively coupled to the polarizer, the controller configured to:
place the polarizer in the first polarization state to provide primarily one of LHCP operation or RHCP operation,
place the polarizer in the third intermediate polarization state to provide simultaneous LHCP and RHCP operation, and
process an RF signal communicated between the linearly-polarized planar antenna and another device while the polarizer is in the third intermediate polarization state.

15. The system according to claim 14, wherein the polarizer further comprises a second polarization state comprising primarily one of the other of LHCP or RHCP.

16. The system according to claim 14, wherein the polarizer comprises a motive device communicatively coupled to the controller and operative to selectively position the polarizer relative to the aperture, wherein the controller is configured to selectively command the motive device to position the polarizer relative to the aperture to produce any one of the polarization states.

17. The system according to claim 16, wherein the motive device is operative to change an angular relationship between the aperture and the polarizer.

18. The system according to claim 14, wherein the polarizer comprises a meander-line polarizer.

19. The system according to claim 18, wherein the meander-line polarizer comprises a plurality of meander-lines, and wherein the controller is configured to place the polarizer in the third intermediate polarization state by commanding the motive device to orient a longitudinal axis of the plurality of meander-lines parallel to the polarization orientation of the E-field of the aperture.

20. The system according to claim 18, wherein the meander-line polarizer comprises a plurality of meander-lines, and wherein the controller is configured to place the polarizer in the third intermediate polarization state by commanding the motive device to orient a longitudinal axis of the plurality of meander-lines perpendicular to the polarization orientation of the E-field of the aperture.

21. The system according to claim 18, wherein the meander-line polarizer comprises a plurality of meander-lines, and wherein the controller is configured to place the polarizer in the first polarization state by commanding the motive device to orient a longitudinal axis of the plurality of meander-lines at a non-zero angle with respect to a polarization orientation of the aperture.

22. The system according to claim 21, wherein the non-zero angle is one of approximately 45 degrees or approximately −45 degrees.

* * * * *